United States Patent

Gullberg et al.

[11] Patent Number: 5,565,684
[45] Date of Patent: Oct. 15, 1996

[54] THREE-DIMENSIONAL SPECT RECONSTRUCTION OF COMBINED CONE-BEAM AND FAN-BEAM DATA

[75] Inventors: Grant T. Gullberg; Gengsheng L. Zeng, both of Salt Lake City, Utah

[73] Assignee: The University of Utah, Salt Lake City, Utah

[21] Appl. No.: 497,620

[22] Filed: Jun. 30, 1995

[51] Int. Cl.$^6$ .................................................. G01T 1/166
[52] U.S. Cl. ................................. 250/363.04; 250/363.1; 364/413.24
[58] Field of Search .......................... 250/363.02, 363.04, 250/363.1; 364/413.24

[56] References Cited

U.S. PATENT DOCUMENTS

| | | | |
|---|---|---|---|
| 5,210,421 | 5/1993 | Gullberg et al. ........................ | 250/363.4 |
| 5,404,293 | 4/1995 | Weng et al. ........................... | 364/413.19 |
| 5,461,232 | 10/1995 | McCandless et al. .................. | 250/363.04 |

OTHER PUBLICATIONS

"Three–Dimensional SPECT Reconstruction of Combined Cone Beam and Parallel Beam Data", Jaszczak, et al., pp. 535–548.
"Three–Dimensional SPECT Reconstruction of Combined Cone–Beam and Fan–Beam Data Acquired Using a Three–Dectector SPECT System", Gullberg, et al.
1995 International Meeting on Fully Three–Dimensional Image Reconstruction in Radiology and Nuclear Medicine, pp. 1–4.

*Primary Examiner*—David P. Porta
*Assistant Examiner*—David Vernum Bruce
*Attorney, Agent, or Firm*—Fay, Sharpe, Beall, Fagan, Minnich & McKee

[57] ABSTRACT

A SPECT system includes three gam camera heads (22a), (22b), (22c) which are mounted to a gantry (20) for rotation about a subject (12). The subject is injected with a source of emission radiation, which emission radiation is received by the camera heads. Camera head (22a) has a fan-beam collimator (24a) mounted on a radiation receiving face and generates fan-beam data indicative of the received emission radiation. The camera heads (22b) and (22c) each have a cone-beam collimator (24b), (24c) mounted respectively on their radiation receiving face and generate cone-beam data indicative of the received emission radiation. A transmission radiation source (26) is mounted opposite the camera head (22a) having the fan-beam collimator (24a). The fan-beam detector head (22a) further receives transmission radiation and generates fan-beam transmission radiation indicative thereof. A transmission data reconstruction processor (50) reconstructs the fan-beam transmission data. An emission data memory (110) separately stores the fan-beam and cone-beam emission data. Attenuation correction processors (78, 86) correct the emission data in accordance with the reconstructed attenuation data. An emission data reconstructor (72) reconstructs the corrected emission data into a corresponding three-dimensional image representation which is selectively displayed on a display (76) in a human-readable form.

13 Claims, 3 Drawing Sheets

THREE-DIMENSIONAL SPECT RECONSTRUCTION OF COMBINED CONE-BEAM AND FAN-BEAM DATA

BACKGROUND OF THE INVENTION

The present invention relates to the art of diagnostic imaging. It finds particular application in conjunction with single-photon emission computed tomography (SPECT) with multi-headed cameras and will be described with particular reference thereto. It is to be appreciated, however, that the invention will also find application in other non-invasive investigation techniques such as positron emission tomography (PET) and other diagnostic modes in which a subject is examined for emitted radiation.

Heretofore, single photon emission computed tomography has been used to study the radionuclide distribution in subjects. Typically, one or more radiopharmaceuticals were injected into a patient. The radiopharmaceuticals were commonly injected into the patient's blood stream for imaging the circulatory system or for imaging specific organs which absorb the injected radiopharmaceuticals. Gamma or scintillation camera heads were placed closely adjacent to a surface of the patient to monitor and record emitted radiation. In single photon-emission computed tomography, the head was rotated or indexed around the subject to monitor the emitted radiation from a plurality of directions. The monitored radiation data from the multiplicity of directions was reconstructed into a three dimensional image representation of the radiopharmaceutical distribution within the patient.

SPECT systems typically use one or more large field of view gamma camera heads that rotate about the patient. When cone-beam collimation was used with these systems, the source distribution was not sampled sufficiently. Blurring artifacts occurred with filtered backprojection reconstruction, particularly for sources located away from the central slice.

Maximum likelihood approaches using an expectation-maximization algorithm have resulted in improved image quality for cone-beam SPECT systems as compared with filtered backprojection methods. However, because the cone-beam projection data acquired using a single circular orbit were inherently incomplete in the axial direction, image distortions could not be entirely eliminated. Furthermore, truncation artifacts resulted for sources that were outside the field of view of the cone-beam collimator at certain times during the scan. Other systems have attempted to reduce axial truncation artifacts by combining simultaneously acquired parallel beam and cone-beam data.

The present invention contemplates a new and improved simultaneous transmission and emission tomography method and apparatus which overcomes the above-referenced problems and others.

SUMMARY OF THE INVENTION

In accordance with one aspect of the present invention, an emission tomography system is provided. Two or more gamma cameras are mounted at about regular intervals around a subject that is to receive an emission radionuclide. A fan-beam collimator is mounted on a radiation receiving face of one gamma camera head. A cone-beam collimator is mounted on a radiation receiving face of another gamma camera head. The gamma camera heads receive at least emission radiation and generate cone-beam data and fan-beam data indicative thereof. A reconstruction processor reconstructs a three-dimensional image representation from the cone-beam and fan-beam data.

In accordance with a more limited aspect of the present invention, a transmission radiation source is disposed across the examination region, opposite to the gamma camera head with the fan-beam collimator. The one gamma camera further receives transmission radiation and generates transmission fan-beam data. Attenuation coefficients are determined from the transmission fan-beam data which are used for attenuation correction of the cone-beam and fan-beam emission data.

In accordance with a more limited aspect of the present invention, the gamma camera system includes a transmission data reconstruction processor which reconstructs the transmission fan-beam data. A combining means combines the emission data produced by each of the gamma camera heads. An attenuation corrector weights the combined emission data in accordance with the reconstructed transmission data. An emission data reconstruction processor reconstructs the weighted emission data into a corresponding three-dimensional image representation.

In accordance with another aspect of the present invention, a method of generating an image representation of an interior portion of a subject who is injected with a radiopharmaceutical is provided. Emission radiation is collected with a first detector having a fan-beam collimator. Fan-beam emission data is generated indicative of the collected emission radiation. The emission radiation is further simultaneously collected with a second detector having a cone-beam collimator. Cone-beam emission data is generated indicative thereof.

In accordance with a more limited aspect of the present invention, the fan-beam emission data is reconstructed by backprojection. The reconstructed fan-beam emission data is forward projected into a first Radon domain data. A partial derivative is taken of the first Radon domain data. The cone-beam emission data is rebinned into a second Radon domain data. The first and second Radon domain data is then combined. The combined Radon domain data is normalized. The normalized Radon domain data is reconstructed by backprojection into a corresponding three-dimensional image representation.

One advantage of the present invention is that it simultaneously collects fan-beam transmission and emission data to provide sufficient data to reconstruct insufficient cone-beam emission data.

Another advantage of the present invention is that it provides a method to reconstruct a combination of fan-beam and cone-beam data.

Another advantage of the present invention is that it increases detection efficiency while simultaneously acquiring sufficient data to reconstruct the cone-beam data.

Another advantage of the present invention resides in the reconstruction speed.

Still further advantages will become apparent to those of ordinary skill in the art upon reading and understanding the following detailed description.

BRIEF DESCRIPTION OF THE DRAWINGS

The invention may take form in various steps and arrangements of steps and in various components and arrangements of components. The drawings are only for purposes of illustrating the preferred embodiment and are not to be construed as limiting the invention.

DETAILED DESCRIPTION OF THE PREFERRED EMBODIMENTS

Figure 1:
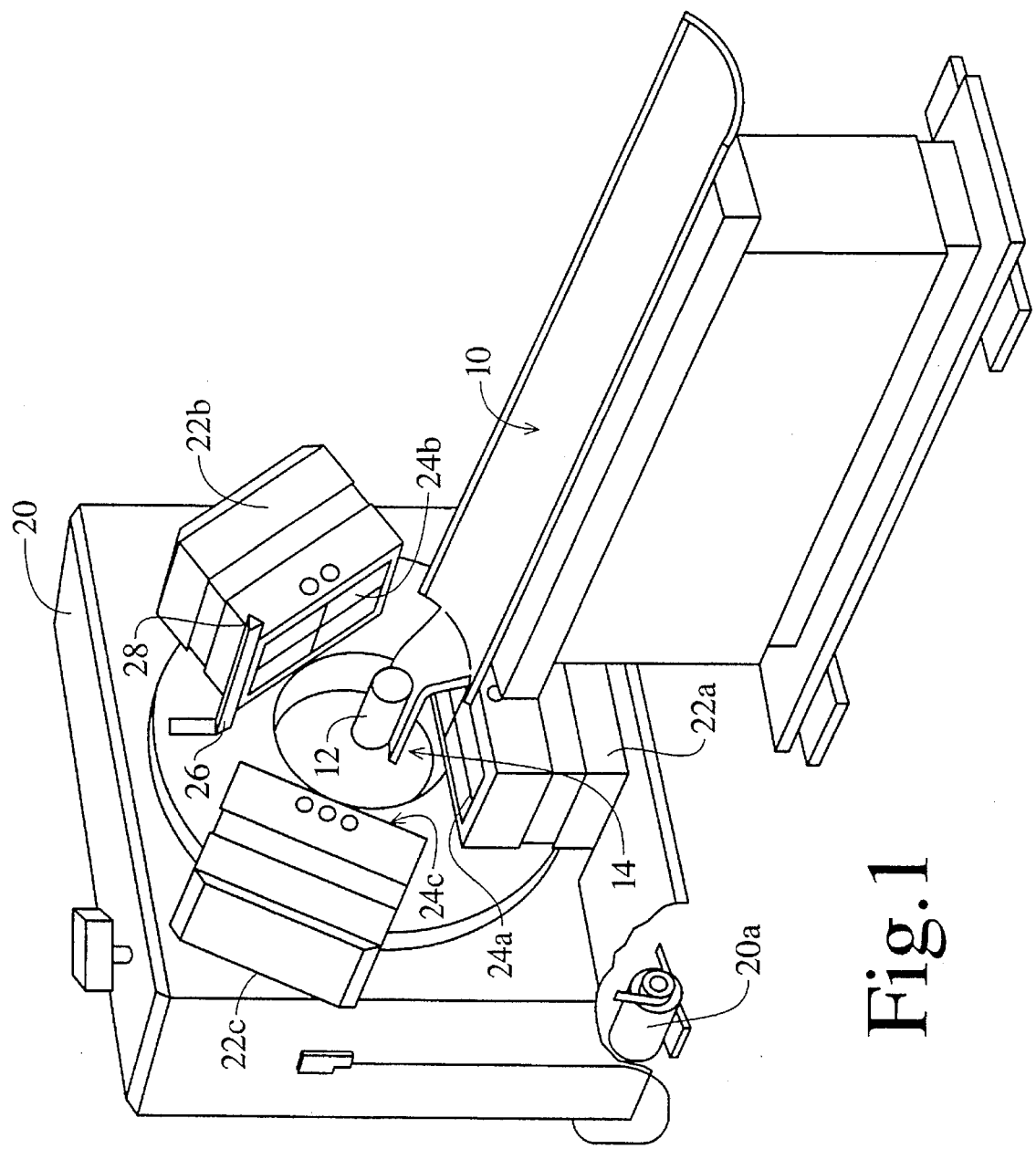
FIG. 1 is a prospective view of a gamma camera system in accordance with the present invention.

With reference to FIG. 1, a SPECT camera assembly includes a patient couch or support means 10 for holding a subject such as a phantom 12 or a human patient in an examination region 14. A gantry 20 supports a plurality of gamma camera heads 22a, 22b, and 22c at regular intervals around the examination region 14, e.g., 120°. Motors 20a are provided for rotating the camera heads around the subject (not shown) and moving the camera heads toward and away from the subject during the rotation, as is conventional in the art.

A fan-beam collimator 24a is mounted on a radiation receiving face of the first camera head 22a. Cone-beam collimators 24b and 24c are mounted respectively on the second and third camera heads 22b and 22c. The subject to be examined is injected with a radiation emitting source such as a radiopharmaceutical. To increase the collection of data and improve image resolution, a transmission radiation source 26 is disposed opposite the first camera head 22a which has the fan-beam collimator 24a. During a scan, the first camera head 22a simultaneously collects transmission and emission fan-beam data and the other two camera heads 22b and 22c acquire cone-beam emission data. Acquiring simultaneous transmission and emission fan-beam data and emission cone-beam data increases the geometric efficiency for imaging an interior portion of a patient, such as the heart, while at the same time obtaining sufficient data sampling for planar orbit cone-beam tomography.

The radiation source 26, preferably a line source as shown in the FIG. 1 embodiment, is mounted directly opposite the fan-beam camera head 22a and between the other two gamma camera heads 22b, 22c. The radiation source is selectively positionable radially either closer to or further from the fan-beam camera head 22a. Preferably, the radiation source is disposed at the apex of the fan defined by the fan-beam collimator and behind a plane of the face of the cone-beam camera heads 22b and 22c such that radiation therefrom does not impinge directly on the cone-beam camera heads 22b, 22c. A collimating or shield 28 is mounted to the radiation source to limit the projection of radiation to a fan-beam that intercepts the fan-beam camera head 22a. The transmission radiation source may be a tube or vessel filled with a radionuclide or an active radiation generator such as an x-ray tube. Alternately, the transmission radiation source 26 may be mounted to one of the cone-beam heads 22b or 22c. Because movement of either head radially changes the effective angle of the fan, the position of the transmission source and the reconstruction algorithm are adjusted with changes in radial head position to accommodate the changing effective fan angle. The effective fan angle is preferably precalculated and stored in, for example, a look-up table.

Each camera head has a scintillation crystal that responds to incident radiation by producing a flash of light. An array of photomultiplier tubes produce electrical signals in response to each flash of light. The signals responsive to the same scintillation or flash of light are combined. The magnitude of the resultant sum is indicative of the energy of the incident radiation and the relative response of the closest photo-multiplier tubes is indicative of the spatial location of the scintillation.

The collimators 24a, 24b, and 24c limit each incremental area of the scintillation crystal receiving radiation from along a fixed direction or ray. The cone-beam collimators 24b and 24c have a plurality of paths defined by bores in a solid lead sheet or by lead septa which focus at a focal point. The cone-beam collimators are oriented such that the focal point is disposed across the examination region from a subject therein. Radiation emanating from the subject follow diverging paths through the cone-beam collimators 24b, 24c to the gamma camera heads 22b and 22c, respectively. In this manner, a relatively small region of the subject is projected onto a relatively large region of a crystal face of the detector heads 22b and 22c, i.e., an effective magnification.

Similarly, the fan-beam collimator 24a has a plurality of paths defined by bores in a solid lead sheet or by lead septa. However, the lead septa focus at a focal line that is parallel to the axis of rotation of the detector heads 22a, 22b, and 22c. Along the axis of rotation, the fan-beam collimator 24a has a parallel collimation, i.e., a plurality of parallel fans are defined.

Conventional gamma camera heads can image radiation in two or more energy windows or ranges simultaneously. In a conventional dual energy gamma camera head, the sum signals are sorted based on amplitude. More specifically, energy windows or ranges are defined. Each window corresponds to a photopeak or energy spectrum of a radionuclide to be used in the examination. In the preferred embodiment, the injected or emission radionuclide has one preselected energy and the radiation source 26 or transmissive radiation has a second different energy. In this manner, the fan-beam camera head 22a separates the transmission and emission radiation data by using the conventional energy separation circuitry used during dual injected radiopharmaceutical examinations. A position resolver resolves the position on the crystal, hence the ray angle, corresponding to scintillations or radiation events within one of the energy windows.

Figure 2:
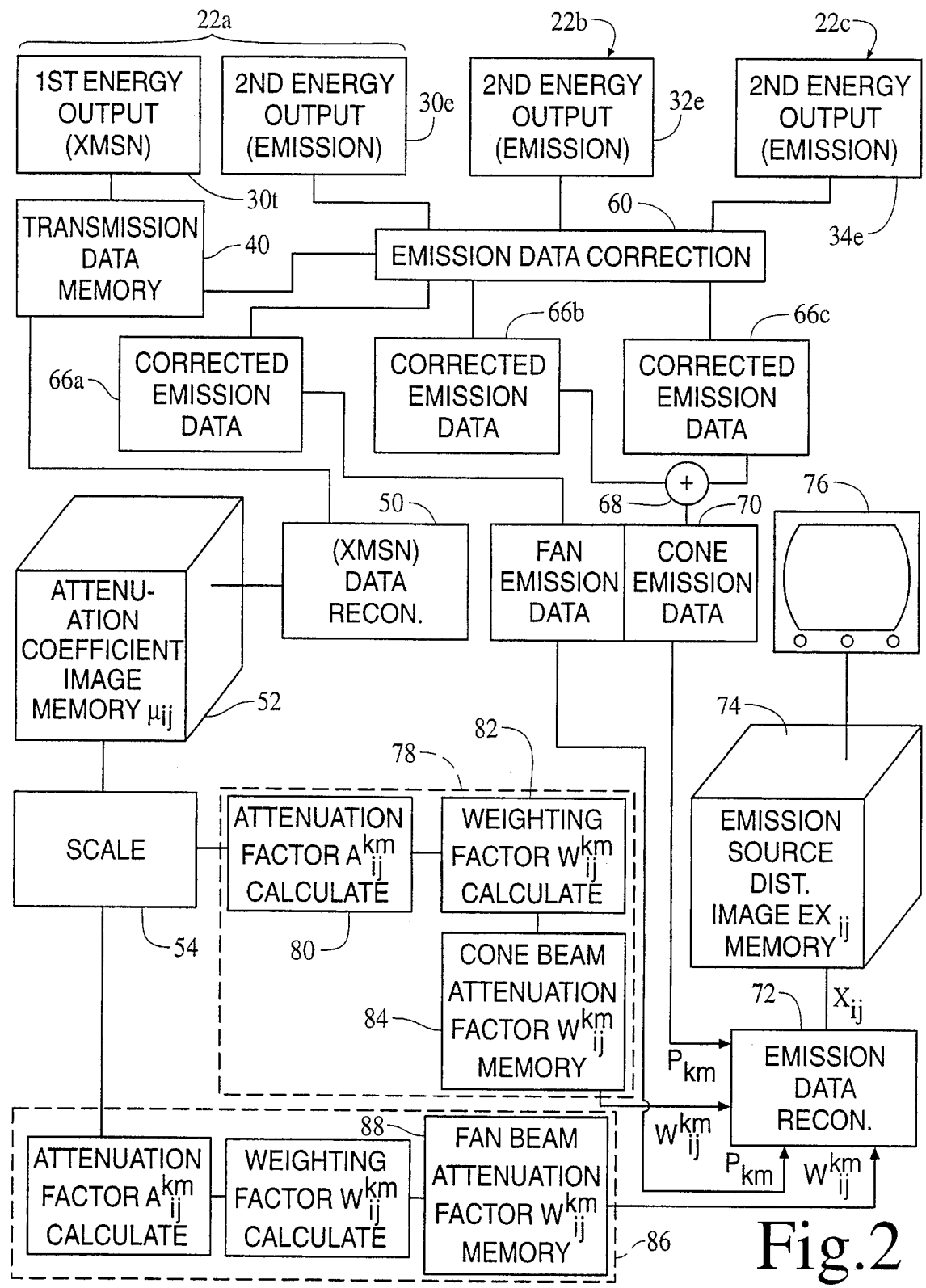
FIG. 2 is a diagrammatic illustration of the apparatus and method of processing the cone-beam, fan-beam emission data and the fan-beam transmission data in different energy ranges collected with the camera system of FIG. 1.

With reference to FIG. 2, the fan-beam head 22a has first energy level output means 30t for separating and outputting location or ray signals for each scintillation with an energy in the range of the transmission source 26 and a second energy level output means 30e for separating and outputting location or ray signals for each scintillation in the energy range of the emission radionuclide. A transmission projection data memory 40 stores the transmission projection data from the fan-beam head 22a.

A transmission reconstructor 50 reconstructs the transmission radiation data with a conventional CT or iterative reconstruction algorithm into a three dimensional electronic image representation stored in a three dimensional transmission radiation or attenuation image memory 52. Each pixel or voxel of the attenuation image memory 52 represents the radiation attenuation by a corresponding pixel or voxel of the examination region 14 or the subject being examined. Thus, when an emission radiation event occurs at a given pixel or voxel, one can determine the amount of radiation attenuation along the rays between the event voxel and the points on each head at which the scintillation occurs by summing the attenuation values of each pixel or voxel through which the ray passes. The attenuation probability of detection is the exponentiation of the negative of this sum. A further correction can be made by determining the distance through each intervening pixel or voxel the ray passes. When the ray extends through a pixel or voxel squarely from one face to the opposite face, the entire attenuation value is added. If the path goes through only a small corner, a correspondingly smaller portion of the attenuation value is added. A scaling function 54 adjusts the attenuation data in accordance with the relative energy of the transmission and emission sources, e.g. the ratio or a non-linear relationship of energy.

A goal in transmission CT is to compute local attenuation coefficients for the object of interest. The recorded projection data in a transmission scan is preferably converted by taking the natural logarithm of the ratio of unattenuated acquired count per pixel or voxel (flood image $N_0$) to observed count at a given pixel (recorded projection N). Alternately, the transmission coefficients can be reconstructed directly from the attenuation data and the measured radiation flux (flood image) using an iterative type algorithm. For those regions with observed count greater than the flood image, the line integral of the attenuation coefficients is set equal to zero, i.e.:

$$N = N_0 \times e^{-\mu x} \quad (1a)$$

$$\text{projection} = \int \mu dx = \ln\left(\frac{N_0}{N}\right) \text{ of } N \leq N_0 \quad (1b)$$

$$\text{projection} = 0 \text{ if } N > N_0 \quad (1c)$$

A conventional CT or iterative reconstruction algorithm is used to obtain the map of attenuation coefficients $\mu_{ij}$. The calculated attenuation map is used to correct for the photon attenuation in the emission study.

By way of a specific example of the scaling function 54 in which scales the attenuation coefficients $\mu^{T1}_{ij}$ of a 75 kev T1-201 emission source relative to the attenuation coefficients $\mu^{TC}_{ij}$ of a 140 kev TC-99m transmission source, the attenuation coefficients $\mu^{T1}_{ij}$ for T1-201 emission is approximated by:

$$\mu^{T1}_{ij} = \frac{\mu_{75kev}}{\mu_{140kev}} \times \mu^{TC}_{ij} = \frac{0.184/\text{cm}}{0.153/\text{cm}} \times \mu^{TC}_{ij} = 1.2\mu^{TC}_{ij}. \quad (2)$$

Another scaling method is applied to the higher energy (140 kev) attenuation map. This method uses a look-up table of the linear attenuation coefficients for different materials at both 75 kev and 140 kev. A data interpolation technique is used to determine the scaling factor to transform the attenuation distribution at 140 kev to that at 75 key. Alternately, other transmission/emission isotope combinations can be used such as americium/thallium, gadolinium/technetium, cobalt/thallium, or the like.

The first cone-beam head 22b similarly has an emission energy location or ray signal output means 32e and the second cone-beam head 22c has an emission energy ray signal output 34e. Some of the transmission photons and scattered emission photons are detected within the emission radiation energy range. Optionally, an emission radiation correction processor 60 removes a component of the measured emission radiation which is attributable to the transmission radiation. Corrected emission ray or location signal memories for the fan-beam data 66a, and the cone-beam data 66b, and 66c store the corrected emission projection data from heads 22a, 22b, 22c, respectively. A combining circuit 68 combines the corrected emission data from cone-beam heads 22b, and 22c. More specifically, the combining circuitry combines data from each head representing the same ray. That is, the collimator defines the path, relative to the head, along which radiation travelled to cause scintillation at the monitored location on the head. The location on the head and the angle of the head when the event was monitored define the ray or path between the corresponding emission source and the point of receipt.

The corrected emission projection data is stored in a total emission projection data memory 70 as separated fan-beam and cone-beam emission data. An emission data reconstruction processor 72 reconstructs the emission data into a corresponding three dimensional image representation which is stored in an emission image memory 74. A video display terminal 76 or other display means provides a manreadable display of the reconstructed emission distribution. Typically, various displays will be selected, such as transverse or lateral slices through the patient, or even a three dimensional prospective representation. An attenuation correction circuit 78 corrects the emission data $P_{km}$ from total emission projection data memory 70 for attenuation by iterative reconstruction algorithms or processor and provides corrected emission projection data to the emission data reconstruction processor.

Although the projection data is preferably processed in three dimensions, the following mathematical description is given in two dimensions for simplicity of illustration. The emission projection data $P_{km}$ at projection angle $\Theta_m$ and detector bin or ray k, and the image or back projection value $X_{ij}$ at pixel (i,j) are defined in two dimensions as:

$$P_{km} = \Sigma_{ij} W^{km}_{ij} X_{ij} \quad (3a)$$

$$X_{ij} = \Sigma_{k,m} W^{km}_{ij} P_{km}, \quad (3b)$$

where the weighting factor $W^{km}_{ij}$ is given by $$W^{ij}_{km} = \frac{A^{km}_{ij}}{\mu_{ij}} (1 - e^{\mu_{ij} l^{km}_{ij}}) \text{ if } \mu_{ij} > 0. \quad (3c)$$

$$W^{km}_{ij} = l^{km}_{ij} A^{km}_{ij}, \text{ if } \mu_{ij} = 0, \quad (3d)$$

where $l^{km}_{ij}$ is the length of the ray through the pixel. The attenuation factor $A^{km}_{ij}$ is the exponential of the line integral of the attenuation coefficient $\mu_{ij}$ from $b_{ij}$, the entry point of projection ray to the pixel (i,j), to the detector. If no attenuation correction is needed, the attenuation coefficient $\mu_{ij}$ is set to be zero.

More specifically, a cone-beam attenuation correction circuit 78 includes an attenuation factor calculator 80 which calculates the attenuation factors $A^{km}_{ij}$ along the cone rays. The attenuation factor calculator calculates the exponential of the line integral of the scaled attenuation coefficients $\mu_{ij}$ along each cone-beam ray k at angle $\Theta_m$ between pixel (i,j) and the detector head. Of course, zero values for rays that do not intersect the pixel need not be stored.

A weighting factor calculator 82 calculates the weighting factors $W^{km}_{ij}$ in accordance with Equation (3c) for each cone-beam emission data ray k and angle $\Theta_m$ and each pixel (i,j) of the emission distribution image memory 74. The calculated weighting factors are stored in a cone-beam attenuation weighting factor memory or look-up table 84.

A fan-beam attenuation correction circuit 86 analogously calculates attenuation factors A along fan-beam rays and weighting factors W along the fan-beam rays from the attenuation factors. The fan-beam weighting factors are stored in a fan-beam weighting factor memory 88.

The emission data reconstructor 72 performs the multiplication and summing of Equation (3b) with the cone-beam data and weighting factors and with the fan-beam weighting factors.

The image values $X_{ij}$ are progressively built at each iteration in accordance with the iterative scheme of Equation (4) below.

As in most reconstruction schemes, the subject region is divided into small voxels or pixels. For each voxel, an emission radionuclide concentration and a projection radiation attenuation coefficient are determined. These parameters can be estimated by maximizing the likelihood (probability of observations). The preferred algorithm includes a technique for computing maximum likelihood estimates. This algorithm has the unique ability to model the Poisson nature of photon counting and the physical differences between transmission and emission tomography. For SPECT, photon attenuation and variation of resolution with depth can be treated appropriately and the use of an accurate statistical model can improve the quality of reconstruction with low counts. The combination of good statistical and physical models should produce superior reconstructions. The preferred algorithm which the emission data reconstructor 72 performs is the EM iterative reconstruction algorithm, i.e.:

$$X_{ij}^{n+1} = \frac{X_{ij}^n}{\Sigma_{k',m'} W_{ij}^{k'm'}} \Sigma_{k,m} \left[ W_{ij}^{km} \frac{P_{km}}{P_{km}^n} \right]. \quad (4)$$

Figure 3:
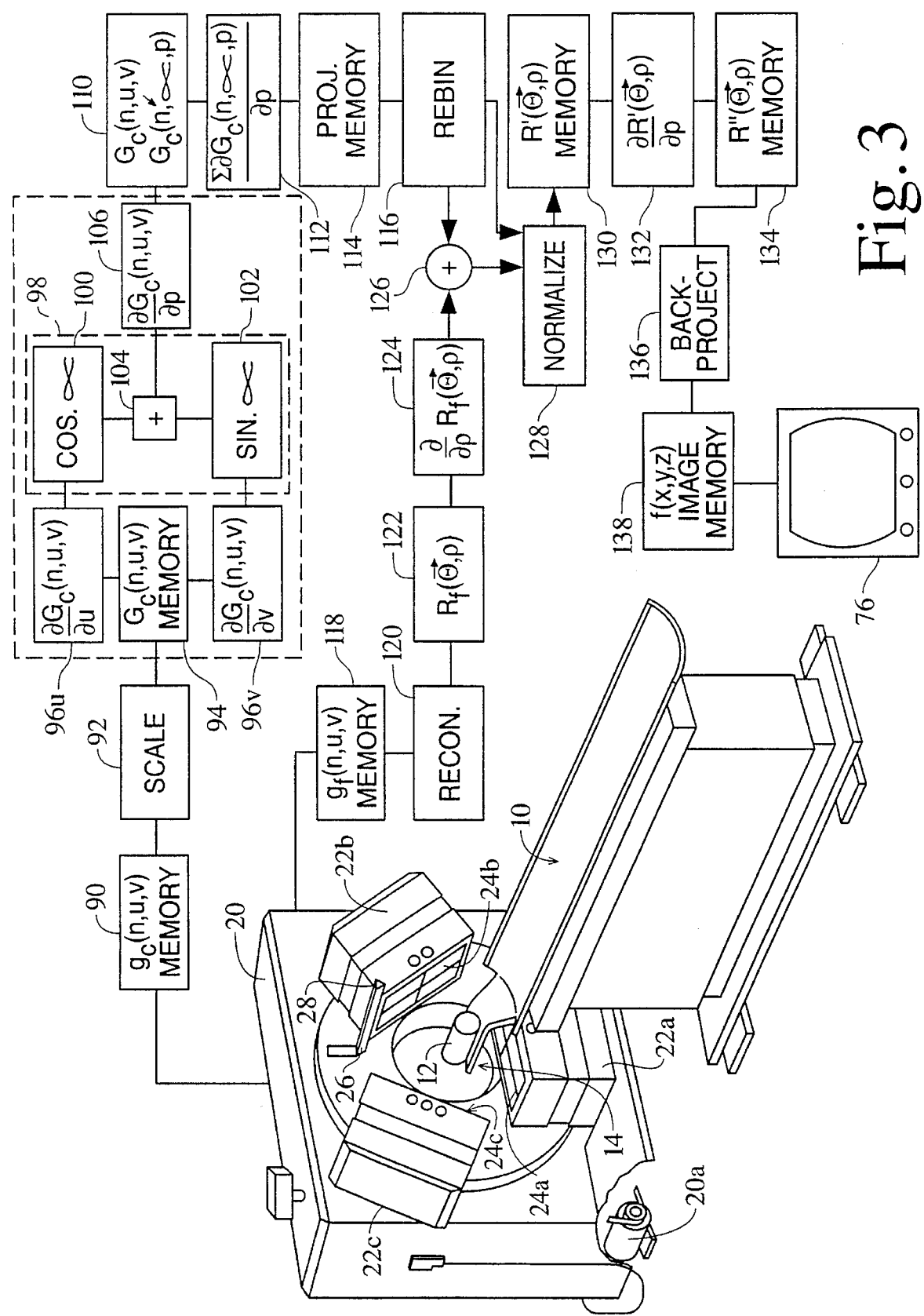
FIG. 3 is a diagrammatic illustration of the apparatus and method of reconstructing an image with the cone-beam and fan-beam emission data.

With reference to FIG. 3, an image can be reconstructed quickly from the fan-beam and cone-beam emission data using an analytical approach. Cone-beam output data $g_c$(n, u,v) from the detector heads 22b and 22c during an orbit Γ is stored in a cone-beam projection data memory 90. In the projection data coordinate system, n is the index of the views, i.e. an angular orientation around the central axis; v is the central axis of rotation which lies along the patient, i.e. parallel to the patient support couch; and u is coordinate of the detector head perpendicular to the axis v and tangential to the orbit Γ. A scaling function 92 scales or weights the cone-beam projection data to generate weighted cone-beam projection data $G_c$(n,u,v) which is stored in a weighted projection data memory 94. Preferably, this scaling or weighting function multiplies the cone-beam projection data $g_c$(n,u,v) by a value based on the geometry of the gantry and the system.

Line integrals of the cone-beam data are generated. More specifically, a first partial derivative step or means 96u takes a partial derivative of the weighted cone-beam projection data $G_c$(n,u,v) with respect to the direction of axis u. A second partial derivative step or means 96v takes the partial derivative of the weighted cone-beam projection data $G_c$(n, u,v) with respect to the direction v. A linear combiner 98 linearly combines the partial derivatives with respect to u and v. More specifically, the linear combiner includes a cosine multiplier 100 and a sine multiplier 102 for multiplying the partial derivatives by the cosine and sine, respectively, of an angle α between the axis u and a vector direction p. An adder 104 adds the products of the partial derivatives of the weighted projection data memory and the sine and cosine values to form a partial derivative of the cone-beam projection data along the p direction, $\partial G_c$(n,u, v)/$\partial p$. This rotates the partial derivative within the plane (u,v) by α degrees to fall along the vector direction p. The partial derivatives of the cone-beam projection data along the vector direction p are stored in a partial derivative along the vector direction p memory 106.

For simplicity, the variables of the partial derivative with respect to p have been redefined $\partial G_c$(n,α,p)/$\partial p$. As explained above, u and v are related to the unit vector direction p by sine and cosine relationships of the angle α. However, in the (n,α,p) coordinate system, a summation along a vector q which lies in the (u,v) plane perpendicular to the vector direction p is more straightforward. A coordinate transformer 110 transforms or rotates the (n,u,v) coordinate system of the partial derivative to a coordinate system (n,α,p).

An integrator 112 integrates or projects the cone-beam data along a vector direction q. The integration is preferably performed by summing row by row or line by line to obtain a one-dimensional array along each vector direction q. The plurality of one-dimensional arrays generated at each angle α are stored in a projection data memory 114. A rebinning step or means 116 rebins or sorts the two-dimensional data arrays from the projection memory 114 into (θ,ρ) of the Radon domain and generates a counting matrix.

To improve the resolution of the cone-beam emission data and fill in areas having an insufficient amount of data, the fan-beam emission data is combined with the cone-beam emission data. The simultaneously collected emission fan-beam data $g_f$(n,u,v) from the detector head 22a during a scan is stored in a fan-beam projection data memory 118. A reconstruction processor 120 reconstructs the fan-beam emission data slice by slice using a convolution backprojection or iterative algorithm. A forward projector 122 forward projects the reconstructed fan-beam emission data to form Radon projections $R_f$(θ,ρ). A partial derivative step or means 124 takes a partial derivative of the Radon projections with respect to an arbitrary vector direction p. In this form, the partial derivatives of the fan-beam Radon projections are combined by a matrix adder 126 with the rebinned two-dimensional data arrays from the cone-beam projection memory 114. A normalizing circuit 128 normalizes the Radon domain derivatives by the counting matrix and stores the data in a first Radon transform derivative memory 130.

A differentiating means 132 takes the second derivative in the normalized Radon domain to generate second derivative Radon domain data R"(θ,ρ) which is stored in a second Radon domain derivative memory 134. A backprojector 136 backprojects the second Radon domain data arrays R"(θ,ρ) into a three-dimensional image representation f(x,y,z) which is stored in a three-dimensional image memory 138. Data from the three-dimensional image memory means is selectively withdrawn for display on the video monitor 76. As is conventional in the art, planes of data may be selected and displayed. Alternately, surface renderings, projections, and other manipulations of the data may be made prior to display, as are known in the art. Data from the image memory 138 may also be stored to disk or other archive memory means.

Reconstruction of the cone-beam data provides an effective magnification of the region of interest with an increase in detector efficiency. The fan-beam data $g_f$(n,u,v) provides a solution to the data insufficiency problems of the cone-beam data by filling missing data. Although described with reference to emission radiation, it is to be appreciated that this technique is equally applicable to CT or other scanners using fan and cone-beam transmission radiation.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In a gamma camera system for diagnostic imaging having at least first and second gamma camera heads disposed for movement around and facing an examination region, each gamma camera head receiving radiation from the examination region and producing electronic data indicative thereof, the improvement comprising:

a fan-beam collimator mounted on a radiation receiving face of the first gamma camera head, such that the first gamma camera head generates fan-beam data indicative of the received emission radiation;

a cone-beam collimator mounted on a radiation receiving face of the second gamma camera head, such that the second gamma camera head generates cone-beam data indicative of the received emission radiation; and, a reconstruction processor for reconstructing a three-dimensional image representation from the cone-beam and fan-beam data.

2. In the gamma camera system as set forth in claim 1, the improvement further comprising:

a transmission radiation source disposed across the examination region and opposite from the first camera head such that the first camera head receives both emission radiation from a radiopharmaceutical in the examination region and transmission radiation from the transmission radiation source and produces emission and transmission data indicative thereof, and the second gamma camera head is disposed to receive emission radiation from the radiopharmaceutical from the examination region.

3. In the gamma camera system as set forth in claim 2, the improvement further comprising the transmission radiation source being one of a line source, a point source, and a bar source.

4. In the gamma camera system as set forth in claim 2, the improvement further comprising:

a transmission data reconstruction processor for reconstructing the transmission data from the first camera head;

an attenuation corrector for correcting the emission data with the reconstructed transmission data for attenuation of the emission radiation; and, an emission data reconstruction processor for reconstructing the corrected emission data into a corresponding three-dimensional image representation.

5. In the gamma camera system as set forth in claim 4, the improvement further comprising: the attenuation corrector includes:

a fan-beam attenuation corrector for correcting the fan-beam emission data in accordance with the reconstructed transmission data; and, a cone-beam attenuation corrector for correcting the cone-beam emission data in accordance with the reconstructed transmission data.

6. In the gamma camera system as set forth in claim 1, the improvement further comprising:

a first reconstruction processor for reconstructing the fan-beam data by backprojection;

a forward projector for forward projecting the reconstructed fan-beam data into first Radon domain data;

a first partial derivative means for taking a partial derivative of the first Radon domain data;

a line integral means for forming line integrals of the cone-beam data;

a second partial derivative means for taking a partial derivative of the line integrals;

a rebinning means for rebinning the differentiated cone-beam line integrals into second Radon domain data;

a combiner for combining the first and second Radon domain data;

a normalizer for normalizing the combined Radon domain data;

a second reconstruction processor for reconstructing by backprojection of the normalized Radon domain data into a corresponding three-dimensional image representation;

a monitor for selectively displaying portions of the three-dimensional image representations.

7. A method of generating diagnostic images of an interior portion of a subject, the method comprising:

injecting the subject with a radiopharmaceutical which emits emission radiation;

collimating the emission radiation travelling toward a first detector into a plurality of fan-beam rays which diverge from a common focal line;

converting the fan-beam rays into emission fan-beam data with the first detector;

collimating the emission radiation travelling toward a second detector into a plurality of cone-beam rays which diverge from a common focal point;

converting the cone-beam rays into emission cone-beam data with the second detector;

rotating the fan-beam focal line and the cone-beam focal point, the fan-beam and cone-beam rays, and the first and second detectors around the subject;

reconstructing a common volumetric image representation from the fan-beam and cone-beam data;

selectively converting portions of the volumetric image representation into the diagnostic images.

8. The method as set forth in claim 7 further including:

directing transmission radiation photons through the subject from a transmission radiation photon source disposed at the fan-beam focal line;

concurrently detecting transmission radiation that has passed through the subject and the emission radiation travelling along the plurality of fan-beam rays with a first detector to generate the emission fan-beam data and fan-beam transmission data; and, reconstructing the emission data into the volumetric image representation.

9. The method as set forth in claim 8 further including:

collimating the emission radiation travelling toward a third detector into a plurality of cone-beam rays which diverge from a second cone-beam focal point;

converting the cone-beam data into Radon planar integrals;

combining the emission Radon planar integrals of the data from the second and third detectors prior to the reconstructing step.

10. The method as set forth in claim 8 wherein the correcting step further includes:

reconstructing the fan-beam transmission data into a three-dimensional representation;

deriving cone-beam attenuation correction factors from the three-dimensional reconstruction, which cone-beam attenuation factors correspond to attenuation along rays of the cone-beam;

deriving fan-beam attenuation correction factors from the three-dimensional reconstruction, which fan-beam attenuation factors correspond to attenuation along rays of the fan-beam; and, combining corresponding attenuation factors with the emission fan-beam data and the emission cone-beam data.

11. The method as set forth in claim 7 further including:

reconstructing the fan-beam emission data;

forward projecting the reconstructed fan-beam emission data into first Radon domain data;

taking a partial derivative of the first Radon domain data;

scaling the cone-beam data;

forming line integrals of the scaled cone-beam data;

taking partial derivatives of the line integrals;

rebinning the differentiated cone-beam line integrals to form second Radon domain data;

combining the first and second Radon domain data;

normalizing the combined Radon domain data; and, reconstructing the combined first and second Radon domain data into the common volumetric image representation.

12. The method as set forth in claim 11 wherein the step of forming line integrals of the cone-beam data includes:

taking first derivatives with respect to the axes of the second detector;

weighting the derivatives in accordance with an angle between the detector axes and a vector direction;

combining the weighted derivatives with respect to the second detector axes;

and wherein the partial derivative taking step includes taking the partial derivative with respect to the vector direction.

13. A gamma camera system for diagnostic imaging comprising:

a first, second, and third gamma heads disposed for movement around and facing an examination region, each gamma camera head receiving emission radiation from the examination region and producing emission data indicative thereof;

a fan-beam collimator mounted on the first gamma camera head;

a cone-beam collimator mounted on each of the second and third gamma camera heads;

a transmission radiation source disposed across the examination region and opposite from the first gamma camera head, the first gamma camera head generating both fan-beam emission data from the received emission radiation from the examination region and fan-beam transmission data from the received transmission radiation; and, a reconstruction processor for reconstructing a three-dimensional image representation from the fan-beam transmission data, the fan-beam emission data, and the cone-beam emission data.

* * * * *